United States Patent [19]

Suzuki

[11] Patent Number: 5,750,977
[45] Date of Patent: May 12, 1998

[54] OPTICAL CODE READER HAVING PLURAL SPOT BEAMS WHICH INTERSECT ONE ANOTHER A PRESET DISTANCE AWAY FROM A READING WINDOW OF THE OPTICAL CODE READER

[75] Inventor: Masashi Suzuki, Mishima, Japan

[73] Assignee: Kabushiki Kaisha Tec, Shizuoka, Japan

[21] Appl. No.: 787,211

[22] Filed: Jan. 22, 1997

Related U.S. Application Data

[63] Continuation of Ser. No. 313,333, Sep. 27, 1994, abandoned.

[30] Foreign Application Priority Data

Sep. 27, 1993 [JP] Japan .................................. 5-239932

[51] Int. Cl.[6] .................................................. G06K 7/10
[52] U.S. Cl. ...................................... 235/472; 235/462
[58] Field of Search .................................. 235/462, 472, 235/455

[56] References Cited

U.S. PATENT DOCUMENTS

| | | | |
|---|---|---|---|
| 4,900,907 | 2/1990 | Matusima | 235/472 |
| 4,933,538 | 6/1990 | Heiman | 235/462 |
| 5,019,699 | 5/1991 | Koenck | 235/472 |
| 5,117,098 | 5/1992 | Swartz | 235/472 |
| 5,235,167 | 8/1993 | Dvorkis | 235/462 |
| 5,280,162 | 1/1994 | Marwin | 235/462 |
| 5,331,143 | 7/1994 | Marom | 235/472 |
| 5,468,951 | 11/1995 | Knowles et al. | 235/472 |
| 5,534,684 | 7/1996 | Danielson | 235/472 |

FOREIGN PATENT DOCUMENTS

| | | |
|---|---|---|
| 6367692 | 3/1988 | Japan . |
| 6083999 | 3/1994 | Japan . |

*Primary Examiner*—Donald T. Hajec
*Assistant Examiner*—Karl Frech
*Attorney, Agent, or Firm*—Frishauf, Holtz, Goodman, Langer & Chick

[57] ABSTRACT

An optical code reader includes a reading window, a reading control circuit for sensing an image of a 2-dimensional code via the reading window in a state where the reading window is set within a preset distance from the 2-dimensional code and converting the sensed image into image data, a guide light source for applying a guide light beam to permit the 2-dimensional code to be guided within the reading range of the reading control circuit, and a portable frame having an opening used as the reading window, for accommodating the reading control circuit and guide light source. In the optical code reader, the guide light beam indicates the center of the reading range and is applied from the guide light source except for a period during which the image of the 2-dimensional code is sensed by the reading control circuit.

5 Claims, 7 Drawing Sheets

F I G. 12

OPTICAL CODE READER HAVING PLURAL SPOT BEAMS WHICH INTERSECT ONE ANOTHER A PRESET DISTANCE AWAY FROM A READING WINDOW OF THE OPTICAL CODE READER

This application is a Continuation of application Ser. No. 08/313,333, filed Sep. 27, 1994 now abandoned.

BACKGROUND OF THE INVENTION

1. Field of the Invention

This invention relates to an optical code reader for reading a 2-dimensional code affixed to an article, and more particularly to an optical code reader which can be held by hand and set close to the 2-dimensional code at the time of reading.

2. Description of the Related Art

Most supermarkets utilize bar codes printed on article labels for sales registration. The bar code represents an article code by a combination of bars linearly arranged and is optically read by a handy type bar code scanner which can be held by hand and set close to the bar code at the time of reading, for example. In recent years, the application field of the bar code has been expanded to factories, distribution industries, service businesses and the like. In these fields of application, it is necessary to represent article information other than the article code for article management by use of the bar code. Therefore, the recording capacity of the bar code tends to become insufficient. By taking this condition into consideration, 2-dimensional codes such as multi-bar codes and matrix array codes have been developed to deal with a large amount of article information.

The conventional 2-dimensional code scanner is constructed by connecting a TV camera, TV monitor and image processor to each other via cables, for example. The TV camera takes an image of the 2-dimensional code printed on an article label in the interior illumination, the TV monitor displays the image of the 2-dimensional code taken by the TV camera, and the image processor effects the image processing operation to derive article information from the 2-dimensional code image. The article information is transmitted to an external host computer connected to the image processor via a communication circuit, for example.

However, the 2-dimensional code scanner is large, heavy and expensive. Further, the operator is required to set the article label to face the TV camera without inclination and adjust the focus and aperture of the TV camera, so that the 2-dimensional code can be correctly read. This makes the start of reading delayed.

The above problem is considered to be solved by constructing the 2-dimensional code scanner such that it can be held by hand at the time of reading like the handy type bar code scanner. However, since the 2-dimensional code cannot be read when it is set partly out of the reading range, the operator must pay much more attention to the projection of the 2-dimensional code.

SUMMARY OF THE INVENTION

An object of this invention is to provide a handy type optical code reader capable of easily and stably setting a 2-dimensional code inside the reading range at the time of reading.

The above object can be attained by an optical code reader comprising a reading window; a reading section for sensing an image of a 2-dimensional code via the reading window in a state where the reading window is set within a preset distance from the 2-dimensional code and converting the sensed image into image data; a guide light source for applying a guide light beam indicating the center of a reading range to guide the 2-dimensional code within the reading range of the reading section, except for a period during which the image of the 2-dimensional code is sensed by the reading section; and a portable frame having an opening used as the reading window, for accommodating the reading section and the guide light source.

In the optical code reader, as the reading window is set closer to the 2-dimensional code, the guide light beam from the guide light source is applied to part of the 2-dimensional code so that a positional deviation of the 2-dimensional code from the center of the reading range can be easily observed. In this case, if the illuminating position of the guide light beam is corrected to be set at the central portion of the 2-dimensional code, the reading window can be set on the 2-dimensional code such that any part of the 2-dimensional code will not lie outside the reading range. Therefore, immediately after the reading window is mounted, the reading unit can start the image sensing operation for the 2-dimensional code. Further, since the guide light source does not apply the guide light beam in a period during which the image of the 2-dimensional code is sensed by the reading section, this image can be prevented from being erroneously sensed due to interference of the guide light beam.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figures 1, 2, 3, 4:
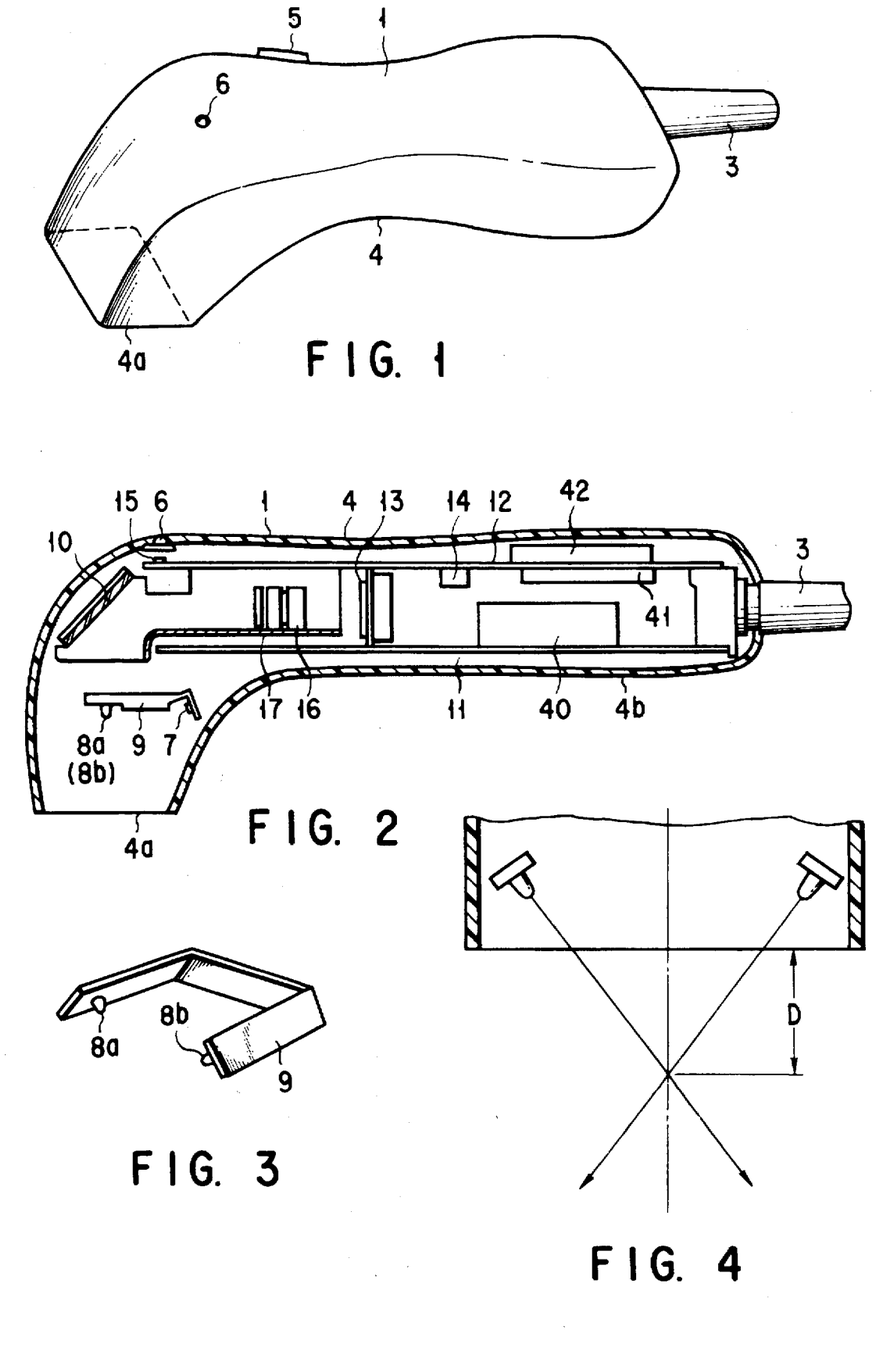
FIG. 1 is a perspective view showing the appearance of a 2-dimensional code scanner according to one embodiment of this invention.
FIG. 2 is a cross sectional view schematically showing the internal structure of the 2-dimensional code scanner shown in FIG. 1.
FIG. 3 is a perspective view of a guide light source shown in FIG. 2.
FIG. 4 is a view showing spot beam lights emitted from the guide light source shown in FIG. 3.

There will now be described a 2-dimensional code scanner according to one embodiment of this invention with reference to the accompanying drawings. FIG. 1 shows the appearance of a 2-dimensional code scanner 1, and FIG. 2 shows the internal structure of the 2-dimensional code scanner 1. The 2-dimensional code scanner 1 has a hollow plastic frame 4 for accommodating various components shown in FIG. 2. The frame 4 can be divided into upper and lower portions which are combined into one by fitting and/or screwing. The frame 4 further has a reading window 4a of the 2-dimensional code scanner at the front end portion thereof and an insertion port for a cable 3 used for connecting the 2-dimensional code scanner 1 to an external data processor, for example, host computer at the rear end portion thereof. The cable 3 contains a power line and data line and is fixed at the insertion port by a protection member such as rubber bush. The rear end portion of the frame 4 is used as a grip portion 4b. The reading window 4a is a rectangular opening with dimensions slightly larger than those of the 2-dimensional code to be read and is set such that the axis normal to the plane of the reading window 4a will be set at an angle larger than 90 degrees, for example, 110 degrees with respect to the central axis of the grip portion 4b. The 2-dimensional code scanner 1 has a trigger switch 5 which projects from the side surface of the frame 4 and a semi-transparent window member 6 provided on the upper surface of the frame 4. In the internal space of the frame 4, an illumination light source 7, guide light source 8, fixed plate 9, deflection mirror 10, first circuit board 11, second circuit board 12, area CCD 13, buzzer 14, indicator LED 15, lens block 16, filter 17 and other components are disposed. The trigger switch 5 is operated by the operator to instruct the reading of a 2-dimensional code when the reading window 4 is set closer than a preset distance D of approx. 20 mm from the 2-dimensional code. The buzzer 14 and indicator LED 15 are used to inform the operator of a reading error or completion of the reading operation. The light from the indicator LED 15 is emitted to the exterior via the window member 6.

The illumination light source 7 and guide light source 8 are arranged in a deeper position than the reading window 4a. The illumination light source 7 is constructed by a plurality of illumination LEDs 7a arranged along the frame of the reading window 4a, for emitting illuminating lights to the exterior via the reading window 4a and a plastic diffusion lens (not shown) for uniformly diffusing the illuminating lights from the illumination LEDs 7a and is mounted on the frame 4 at such an angle as to illuminate the entire portion of the 2-dimensional code in the reading range defined by the reading window 4a. The guide light source 8 is constructed by first and second spot beam LEDs 8a and 8b. The spot beam LEDs 8a and 8b are mounted on the frame 4 together with the fixed plate 9. As shown in FIG. 3, the fixed plate 9 is previously formed so as not to interfere the optical path of the light reflected from the 2-dimensional code and is used to arrange the spot beam LEDs 8a and 8b so as to permit the beam lights to be emitted from the reading window 4a symmetrically with respect to the central axis which passes the central portion of the plane of the reading window as shown in FIG. 4. The angles of the spot beam LEDs 8a and 8b are set such that the guide beam lights will intersect each other in position at a preset distance D (=20 mm) from the reading window 4a along the central axis. With this arrangement, when the reading window 4a has reached the position at the preset distance D from the 2-dimensional code, a single spot on the 2-dimensional code is indicated by the guide beam lights.

The deflection mirror 10 is disposed in a deeper position than the illumination light source 7 and is set at a preset angle with the plane of the reading window to reflect a light incident from the 2-dimensional code via the reading window 4a towards the area CCD 13. The lens block 16 and filter 17 are arranged on the optical path connecting the deflection mirror 10 to the area CCD 13 as optical components. The filter 17 is used to attenuate unwanted extraneous light and the lens block 16 is used to guide the reflected light incident from the deflection mirror 10 to the light receiving surface of the area CCD 13 and form an image of the 2-dimensional code on the light receiving surface. The lens block 16 includes an automatic aperture mechanism for adjusting the amount of transmission light to set the brightness of the image formed on the light receiving surface of the area CCD 13 to an adequate value and group lenses for sufficiently suppressing the distortion of the image. The area CCD 13 is a solid state imaging device for sensing the image formed on the light receiving surface and converting the sensed image into a video signal. The area CCD 13 has a large number of photo-elements arranged in a matrix form and the number of effective photo-elements is set to at least 250,000. The focus of the lens block 16 is so set that an image with contrast ratio which makes it possible to binary-code the video signal can be obtained on the light receiving surface of the area CCD 13 when the reading window 4a has come close to a position at a distance of less than 10 mm from the 2-dimensional code. (The number of effective photo-elements is set to 400,000 or more when the 2-dimensional code is formed with high density. The group lenses of the lens block 16 may be subjected to reflection preventing coating to prevent occurrence of ghost due to surface reflection. The group lenses may be replaced by aspherical lenses which can suppress the distortion of the image on the light receiving surface of the area CCD 13. Further, the deflection mirror 10 may be replaced by a prism).

First and second circuit boards 11 and 12 are boards having various electronic parts mounted on one surface or both surfaces thereof. The electronic parts constitute a reading control circuit in cooperation with the area CCD 13. The reading control circuit is connected to the trigger switch 5, illumination light source 7, guide light source 8, buzzer 14 and indicator LED 15.

Figure 5:
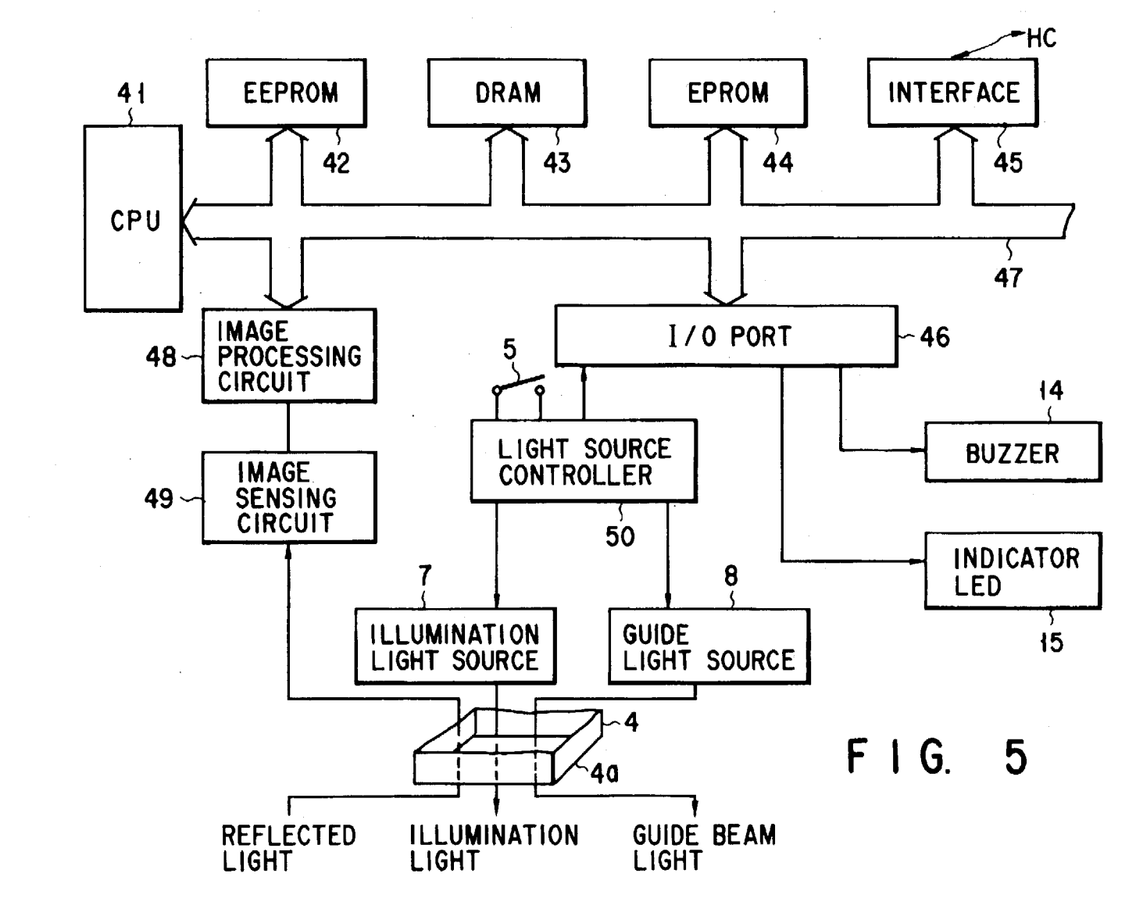
FIG. 5 is a diagram showing the circuit construction of the 2-dimensional code scanner shown in FIG. 2.

FIG. 5 schematically shows the construction of the reading control circuit.

The reading control circuit has a CPU 41, EEPROM 42, DRAM 43, EPROM 44, serial interface 45, input/output port 46, bus line 47, image processing circuit 48, image sensing circuit 49 and light source controller 50. The CPU 41 is connected to the EEPROM 42, DRAM 43, EPROM 44, serial interface 45, input/output port 46, and image processing circuit 48 via the bus line 47. The image processing circuit 48 is connected to the image sensing circuit 49 including the area CCD 13. The input/output port 46 is connected to the light source controller 50, buzzer 14 and indicator LED 15. The light source controller 50 is connected to the trigger switch 5, illumination light source 7 and guide light source 8.

The CPU 41 effects the reading control process for controlling the above various components to read the 2-dimensional code. The EEPROM 42 stores the control program for the reading control process and initial setup data. The DRAM 43 temporarily stores various data. A plurality of memory areas are set in the DRAM 43 to store the above various data in the reading control process. The EPROM 44 stores a conversion table used for converting black/white array data of the 2-dimensional code into article information such as an article code. The interface 45 effects the serial communication with the host computer via the cable 3. The image sensing circuit 49 causes the area CCD 13 to sense an image of the 2-dimensional code, amplifies an output voltage of the area CCD 13 corresponding to the amount of charge derived from each of the photo-elements at a preset clock cycle, and outputs the amplified output voltage as an analog video signal. The image processing circuit 48 converts the analog video signal from the image sensing circuit 49 into dot image data in synchronism with the above clock cycle, extracts a portion corresponding to the 2-dimensional code from the dot image data, and then effects the imaging process for creating the black/white array data based on the extracted image data. The light source controller 50 performs a control of driving the illumination light source 7 and guide light source 8 based on the state of the trigger switch 5. The input/output port 46 supplies a drive control signal for the illumination light source 7 from the light source controller 50 to the CPU 41, and supplies a drive control signal for the buzzer 14 and indicator LED 15 from the CPU 41 to these components. The image processing circuit 48 and image sensing circuit 49 are mounted on the first circuit board 11 side together with a DC—DC converter 40 which converts the power supply voltage from the host computer via the cable 3 into various DC voltages. The other circuit is mounted on the second circuit board 12.

Now, the operation of the 2-dimensional code scanner is schematically explained.

When the power supply of the reading control circuit is turned on, the circuit components are initialized in the reading control process and the guide light source 8 is turned on by the light source controller 50. The operator holds the 2-dimensional code scanner by hand and sets the reading window 4a closer to the 2-dimensional code. At this time, the positional deviation of the 2-dimensional code from the center of the reading range is corrected by referring to the guide beam light from the guide light source 8. The trigger switch 5 is depressed after the reading window 4a is set at a distance of 10 mm or less from the 2-dimensional code.

When the light source controller 50 detects the depression of the trigger switch 5, the illumination light source 7 is turned on instead of the guide light source 8. The light from the illumination light source 7 is applied to the 2-dimensional code, and the reflected light from the 2-dimensional code is guided to the light receiving surface of the area CCD 13 via the deflection mirror 10, filter 17 and lens block 16, and is formed as an image of the 2-dimensional code. When the image is sensed by the area CCD 13, the image sensing circuit 49 amplifies an output voltage of the area CCD 13 corresponding to the amount of charge derived from each of the photo-elements at a preset clock cycle, and supplies the amplified output voltage to the image processing circuit 48 as an analog video signal. The image processing circuit 48 converts the analog video signal into dot image data in synchronism with the above clock cycle, extracts a portion corresponding to the 2-dimensional code from the dot image data, and then effects the imaging process for creating black/white array data based on the extracted image data.

The CPU 41 starts the decoding process as part of the reading control process in response to the drive control signal supplied from the light source controller 50 via the input/output port 46 when the illumination light source 7 is turned on. In the decoding process, the CPU 41 stores the black/white array data derived from the image processing circuit 48 into the DRAM 43, and converts the black/white array data into article information by use of the conversion table stored in the EPROM 44. When the decoding process is correctly completed, the article information obtained as the result of conversion is transmitted to the host computer via the interface 45 and the buzzer 14 and indicator LED 15 inform the completion of the reading. On the other hand, if the decoding process is not correctly completed, the decoding process is repeated and then the buzzer 14 and indicator LED 15 inform the erroneous reading.

Figure 6:
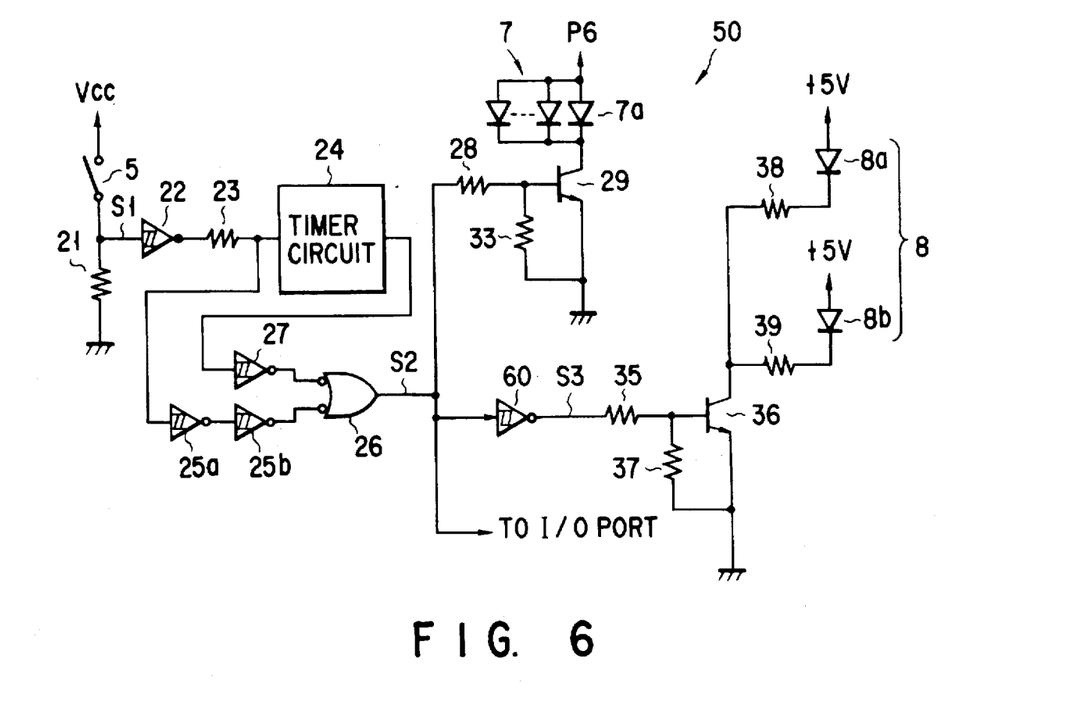
FIG. 6 is a diagram showing the circuit construction of a light source controller shown in FIG. 5.

FIG. 6 shows the circuit construction of the light source controller 50 in more detail. The trigger switch 5 is connected in series with a resistor 21 between the power supply terminal Vcc and the ground terminal. A connection node between the trigger switch 5 and the resistor 21 is connected to the input terminal of a timer circuit 24 via an inverter 22 and a resistor 23. The timer circuit 24 is constructed to set an output signal from the output terminal to a high level in response to an input signal of high level supplied when the trigger switch 5 is depressed and keep the output signal at the high level until a preset period of time required for the area CCD 13 to repeat the image sensing operation elapses. The output terminal of the timer circuit 24 is connected to a first negative logic input terminal of an OR circuit 26 via an inverter circuit 27. On the other hand, the input terminal of the timer circuit 24 is connected to a second negative logic input terminal of the OR circuit 26 via inverter circuits 25a and 25b. The output terminal of the OR circuit 26 is connected to the input/output port 46, to the base of an NPN transistor 29 via a resistor 28, and to the base of an NPN transistor 36 via an inverter circuit 60 and a resistor 35. The base of the NPN transistor 29 is connected to the emitter thereof via a resistor 33, the emitter of the NPN transistor 29 is connected to the ground terminal, and the collector of the NPN transistor 29 is connected to a illumination power supply terminal P6 via a parallel circuit of illumination LEDs 7a. The base of the NPN transistor 36 is connected to the emitter thereof via a resistor 37, the emitter of the NPN transistor 36 is connected to the ground terminal, and the collector of the NPN transistor 36 is connected to a power supply terminal of 5 V via a resistor 38 and spot beam LED 8a and to the power supply terminal of 5 V via a resistor 39 and spot beam LED 8b.

Figure 7:
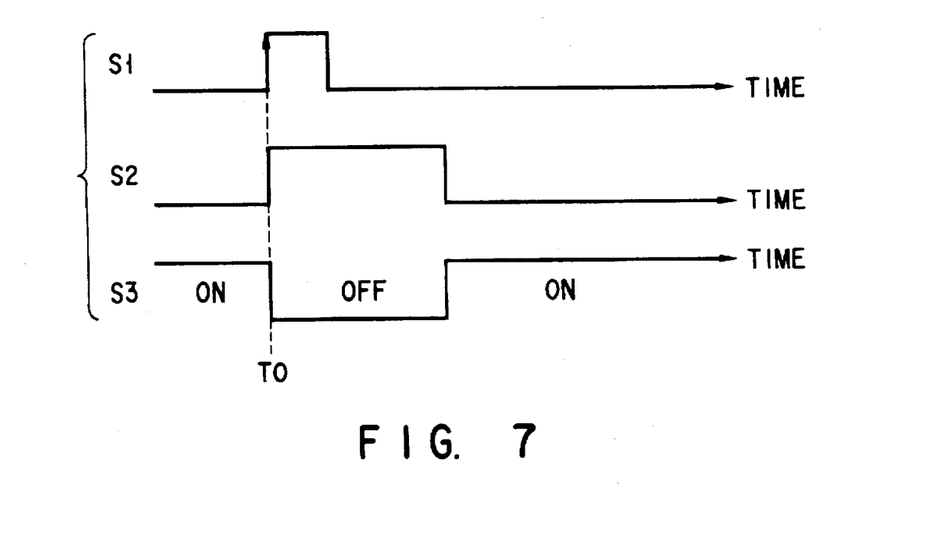
FIG. 7 is a timing chart for illustrating the operation of the light source controller shown in FIG. 6.

In the light source controller 50 shown in FIG. 6, when the trigger switch 5 is turned on at time T0, a switch signal S1 is raised to the high level as shown in FIG. 7. The timer circuit 24 generates an output signal of high level after the rise of the switch signal. The output signal is kept at the high level for the above-described preset period of time even if the trigger switch 5 is immediately turned off. An output signal S2 of the OR circuit 26 is is set at the high level for a period from the time when one of the switch signal S1 and an output signal of the timer circuit 24 rises until both of the signals fall. The output signal S2 is used as a drive control signal for the illumination light source 7. The transistor 29 supplies a drive current to the illumination LEDs 7a to activate or turn on the LEDs when the output signal S2 is set at the high level and interrupts the supply of the drive current to turn out the illumination LEDs 7a when the output signal S2 is set at the low level. An output signal S3 of the inverter circuit 60 is an inverted form of the output signal S2 of the OR circuit 26 and is used as a drive control signal for the guide light source 8. The transistor 36 supplies a drive current to the spot beam LEDs 8a and 8b to turn on the LEDs when the output signal S3 is set at the high level and interrupts the supply of the drive current to turn out the spot beam LEDs 8a and 8b when the output signal S3 is set at the low level.

That is, the illumination light source 7 is set in the de-activated state before the trigger switch 5 is turned on and is lit or activated after the trigger switch 7 is turned on. The illumination light source 7 is kept lit for at least a period of image sensing time of the area CCD 13 and then turned out. The guide light source 8 is kept lit while the illumination light source 7 is kept unlit and it is kept unlit while the illumination light source 7 is kept lit.

Control of the guide light source 8 is effected to read the 2-dimensional code without fail. If the guide light source 8 is kept lit after the illumination light source 7 is turned on, the guide light from the guide light source 8 is applied to part of the 2-dimensional code which is disposed at substantially the central portion of the reading range together with the illumination light from the illumination light source 7. For example, when a black mark having a low light reflection factor lies at a portion to which the guide beam light is applied, a difference in light intensity between reflected lights from the white background to which the guide beam light is not applied and the black mark is reduced. That is, the area CCD 13 senses a blurred image having low contrast ratio and it is difficult to correctly convert the sensed image into image data. In this embodiment, in order to solve the above problem, the guide light source 8 is turned out when the illumination light source 7 for emitting an illumination light required for the image sensing operation of the area CCD 13 is turned on.

In the above embodiment, the 2-dimensional code scanner has a structure formed to accommodate all of the optical components and the reading control circuit for sensing an image of the 2-dimensional code via the reading window 4a when the reading window 4a is set within a distance of 10 mm from the 2-dimensional code in the frame 4. Therefore, it becomes possible to form a 2-dimensional code scanner which is small, light and inexpensive.

Further, the operator can hold the 2-dimensional code scanner by hand and attain the 2-dimensional code reading operation by depressing the trigger switch in a state in which the reading window 4a is set within a distance of 10 mm from the 2-dimensional code. At this time, a failure in the reading caused by inclination of the 2-dimensional code with respect to the plane of the reading window can be suppressed by closely attaching the reading window 4a to the 2-dimensional code.

Further, since the distance between the reading window 4a and the 2-dimensional code is set in a range of as short as 10 mm at the time of reading, it is not necessary to effect the focusing and aperture adjustment according to a variation in the distance between the reading window 4a and the 2-dimensional code for each reading operation.

In this embodiment, the spot beam LEDs 8a and 8b are arranged to emit guide light beams which intersect each other in the position at a distance of 20 mm from the reading window 4a along the central axis which passes the center of the plane of the reading window at right angles. Therefore, as the reading window 4a is set closer to the above position, the positional deviation of the 2-dimensional code from the center of the reading range becomes clearer. In this case, if the center of the reading range is aligned with the central portion of the 2-dimensional code, the reading window 4a can be disposed on the 2-dimensional code without causing the 2-dimensional code to be disposed partly outside the reading range. Therefore, it becomes possible to depress the trigger switch 5 immediately after the reading window 4a is disposed on the 2-dimensional code. This will alleviate the load on the operation in comparison with a case where whether the 2-dimensional code is disposed partly outside the reading range or not is checked after the reading window 4a is disposed on the 2-dimensional code.

Further, since the guide beam lights from the spot beam LEDs 8a and 8b are turned out by the operation of the trigger switch 5, the 2-dimensional code can be prevented from being illuminated in a non-uniform light intensity distribution. That is, since an image having preferable contrast ratio can be formed on the light receiving surface of the area CCD 13, the image can be correctly converted into image data.

Figure 8:
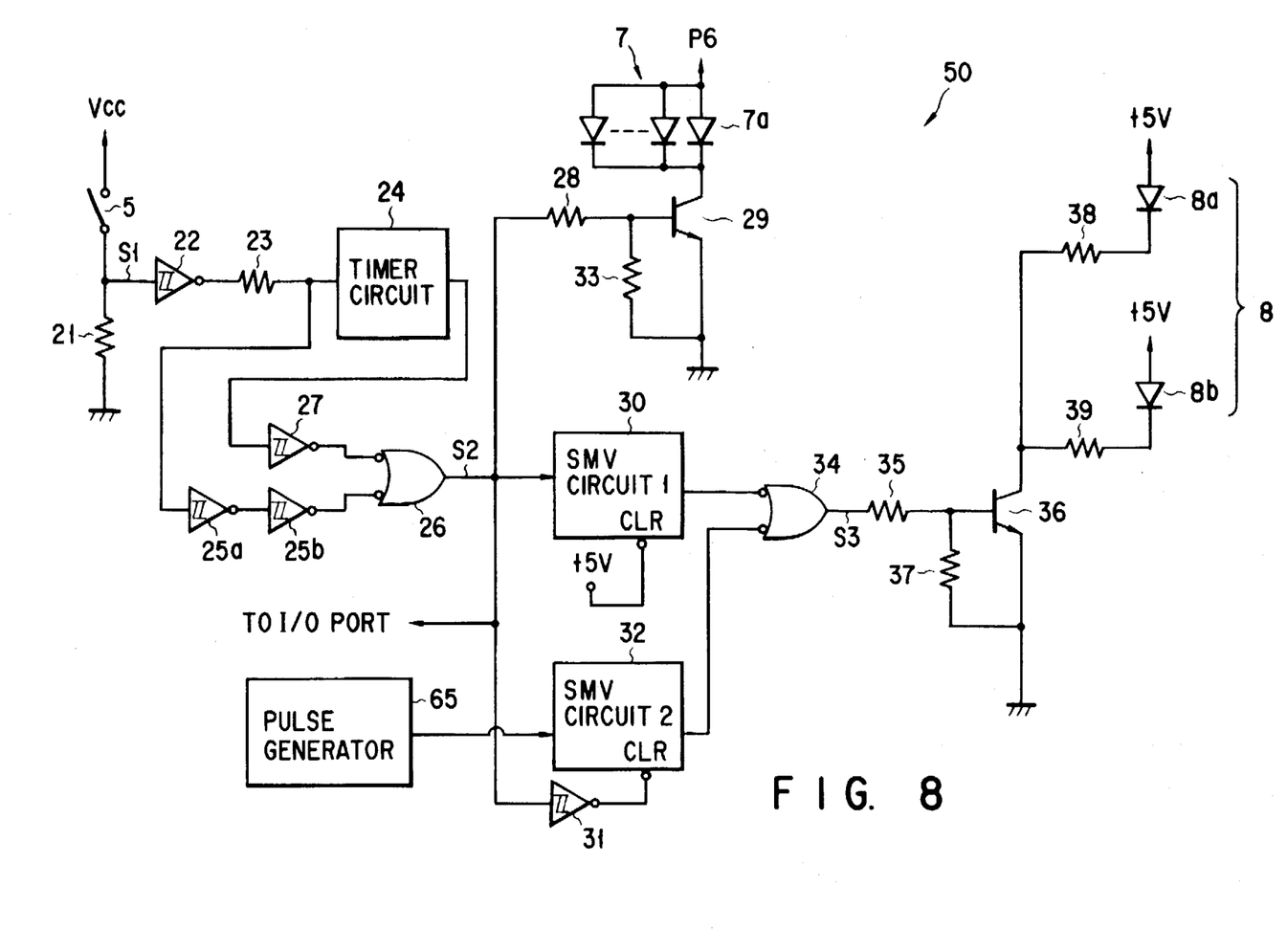
FIG. 8 is a diagram showing a first modification of the light source controller shown in FIG. 6.

FIG. 8 shows a first modification of the light source controller 50. The light source controller 50 is similar to the light source controller shown in FIG. 6, and therefore, common portions are denoted by the same reference numerals and the explanation therefor is omitted. The light source controller 50 of the first modification is not provided with the inverter circuit 60 shown in FIG. 6, but instead of this, it includes a first monostable multivibrator circuit 30, second monostable multivibrator circuit 32, inverter circuit 31, OR circuit 34 and pulse generator 65. The output terminal of the OR circuit 26 is connected to the trigger input terminal of the monostable multivibrator circuit 30 and to the negative logic clear terminal of the monostable multivibrator circuit 32 via the inverter circuit 31. The negative logic clear terminal of the monostable multivibrator circuit 30 is connected to a power supply terminal of 5 V and the trigger input terminal of the monostable multivibrator circuit 32 is connected to the output terminal of the pulse generator 65. The inverting output terminal of the monostable multivibrator circuit 30 is connected to the first negative logic input terminal of the OR circuit 34 and the non-inverting output terminal of the monostable multivibrator circuit 32 is connected to the second negative logic input terminal of the OR circuit 34. The output terminal of the OR circuit 34 is connected to the base of an NPN transistor 36 via a resistor 35. The pulse generator 65 generates a pulse signal of a frequency (20 Hz to 30 Hz) corresponding to the flashing cycle of the guide light source 8.

Since the potential of the negative logic clear terminal of the monostable multivibrator circuit 30 is always set at the high level, the monostable multivibrator circuit 30 is maintained in the operative state. The inverting output terminal of the monostable multivibrator circuit 30 is maintained at the high level when the output signal of the OR circuit 26 is set at the low level and it is kept at the low level for a preset period of time t1 after the rise of the output signal of the OR circuit 26. On the other hand, the monostable multivibrator circuit 32 is set in the operative state when the output signal of the OR circuit 26 is set at the low level and it is set in the non-operative state when the output signal of the OR circuit 26 is set at the high level. The non-inverting output terminal of the monostable multivibrator circuit 32 outputs a pulse with a preset width in the operative state in synchronism with the rise of the pulse signal of the pulse generator 65 and is set to the high level in the non-operative state. The preset time t1 is set to time of approx. 50 ms which is required for the area CCD 13 to correctly sense an image after the start of lighting of the illumination light source 7 or slightly less.

Figure 9:
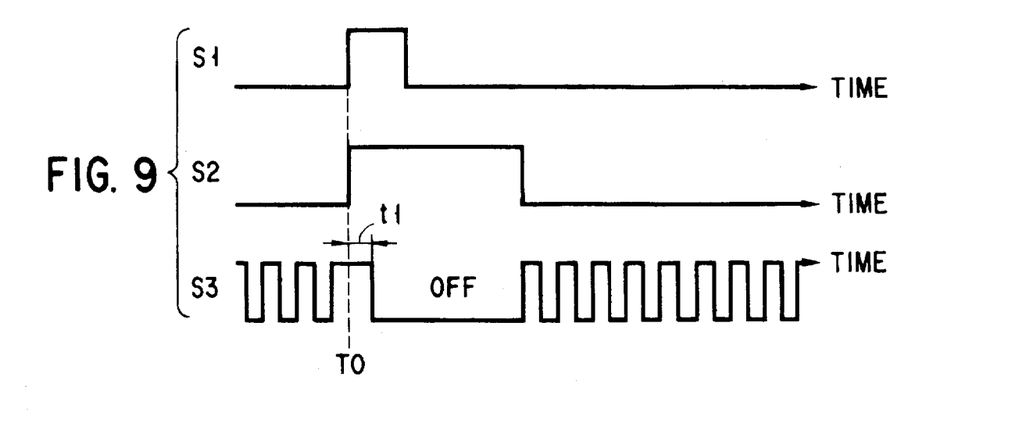
FIG. 9 is a timing chart for illustrating the operation of the first modification shown in FIG. 8.

In the light source controller 50 shown in FIG. 8, when the trigger switch 5 is turned on at time T0, a switch signal S1 is raised to the high level as shown in FIG. 9. The timer circuit 24 generates an output signal of high level after the rise of the switch signal. The output signal is kept at the high level for a preset period of time which is required for the area CCD 13 to repeat the image sensing operation even if the trigger switch 5 is immediately turned off. An output signal S2 of the OR circuit 26 is set at the high level for a period from the time when one of the switch signal S1 and an output signal of the timer circuit 24 rises until both of the signals fall. The output signal S2 is used as a drive control signal for the illumination light source 7. The transistor 29 supplies a drive current to the illumination LEDs 7a to turn on the LEDs when the output signal S2 is set at the high level and interrupts the supply of the drive current to turn out the illumination LEDs 7a when the output signal S2 is set at the low level. An output signal S3 of the OR circuit 34 is a signal corresponding to output signals of the monostable multivibrators 30 and 32 and is used as a drive control signal for the guide light source 8. The transistor 36 supplies a drive current to the spot beam LEDs 8a and 8b to turn on the LEDs when the output signal S3 is set at the high level and interrupts the supply of the drive current to turn out the spot beam LEDs 8a and 8b when the output signal S3 is set at the low level.

That is, the illumination light source 7 is set in the de-activated state before the trigger switch 5 is turned on and is lit or activated after the trigger switch 5 is turned on. The illumination light source 7 is kept lit for at least a period of image sensing time of the area CCD 13 and then turned out. The guide light source 8 flashes on and off at a frequency equal to that of the pulse signal from the pulse generator 65, and is turned off after it is kept lit for a preset period of time t1 from turn-on of the illumination light source 7, and is kept in this state until the illumination light source 7 is turned out.

In the first modification, the following effect can be attained in addition to the effect explained in the above embodiment. That is, since the light source controller 50 of this modification intermittently drives the guide light source 8 at the time of application of the guide beam light, the power consumption can be reduced in comparison with the light source controller 50 of FIG. 6 which continuously drives the guide light source 8 at the time of application of the guide beam light. Further, the light source controller 50 of this modification can delay the turn-off of the guide light source 8 by the preset time t1 without giving bad influence on the image sensing operation of the area CCD 13. (Further, since the monostable multivibrator 32 is set in the non-operative state during the image sensing operation of the area CCD 13, the guide light source 8 can be prevented from being erroneously turned on even when the pulse generator 67 runs away from its normal operation).

Figure 10:
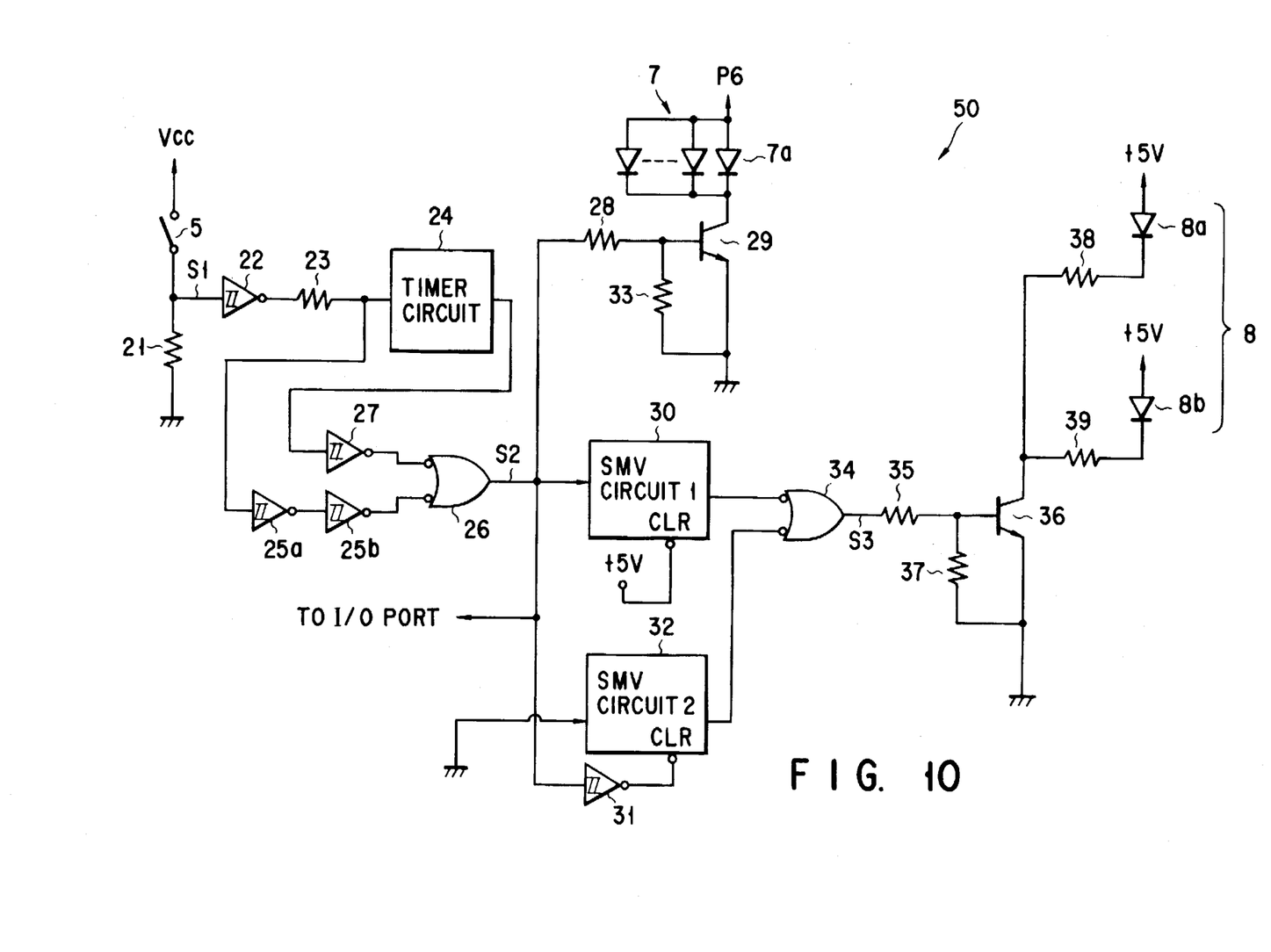
FIG. 10 is a diagram showing a second modification of the light source controller shown in FIG. 6.

FIG. 10 shows a second modification of the light source controller 50. The light source controller 50 is similar to the light source controller shown in FIG. 8, and therefore, common portions are denoted by the same reference numerals and the explanation therefor is omitted. The light source controller 50 of the second modification is not provided with the pulse generator 65 shown in FIG. 8, but instead of this, the trigger input terminal of the second monostable multivibrator circuit 32 is connected to the ground terminal. The monostable multivibrator circuit 32 is set in the operative state when the output signal of the OR circuit 26 is set at the low level and set in the non-operative state when the output signal of the OR circuit 26 is set at the high level. Since the potential of the trigger input terminal of the monostable multivibrator circuit 32 is always set at the low level, the non-inverting input terminal thereof is set at the low level in the operative state and is set at the high level in the non-operative state.

Figure 11:
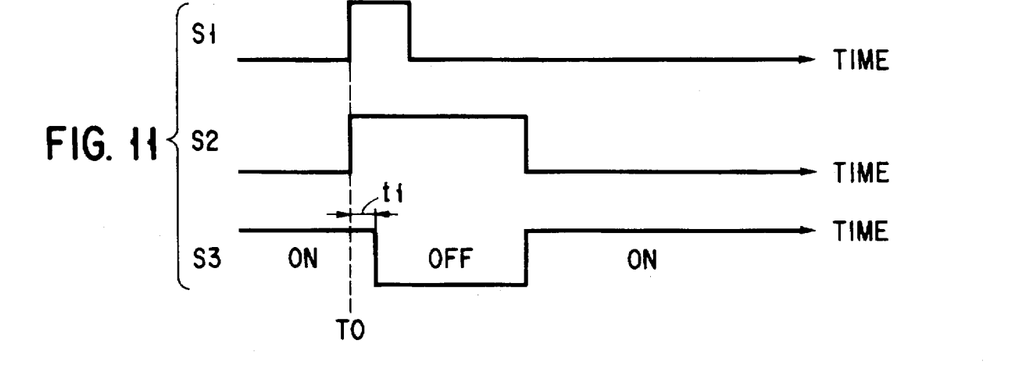
FIG. 11 is a timing chart for illustrating the operation of the second modification shown in FIG. 10.

In the light source controller 50 shown in FIG. 10, when the trigger switch 5 is turned on at time T0, a switch signal S1 is raised to the high level as shown in FIG. 11. The timer circuit 24 generates an output signal of high level after the rise of the switch signal. The output signal is kept at the high level for a preset period of time which is required for the area CCD 13 to repeat the image sensing operation even if the trigger switch 5 is immediately turned off. An output signal S2 of the OR circuit 26 is set at the high level for a period from the time when one of the switch signal S1 and an output signal of the timer circuit 24 rises until both of the signals fall. The output signal S2 is used as a drive control signal for the illumination light source 7. The transistor 29 supplies a drive current to the illumination LEDs 7a to turn on the LEDs when the output signal S2 is set at the high level and interrupts the supply of the drive current to turn out the illumination LEDs 7a when the output signal S2 is set at the low level. An output signal S3 of the OR circuit 34 is a signal corresponding to output signals of the monostable multivibrators 30 and 32 and is used as a drive control signal for the guide light source 8. The transistor 36 supplies a drive current to the spot beam LEDs 8a and 8b to turn on the LEDs when the output signal S3 is set at the high level and interrupts the supply of the drive current to turn out the spot beam LEDs 8a and 8b when the output signal S3 is set at the low level.

That is, the illumination light source 7 is set in the de-activated state before the trigger switch 5 is turned on and is lit or activated after the trigger switch 5 is turned on. The illumination light source 7 is kept lit for at least a period of image sensing time of the area CCD 13 and then turned out. The guide light source 8 is kept lit while the illumination light source 7 is kept unlit and for a preset period of time t1 from turn-on of the illumination light source 7, and is then turned out and kept in this state until the illumination light source 7 is turned out.

In the second modification, the effect similar to that of the first modification except the effect of reduction in the power consumption can be attained.

Figure 12:
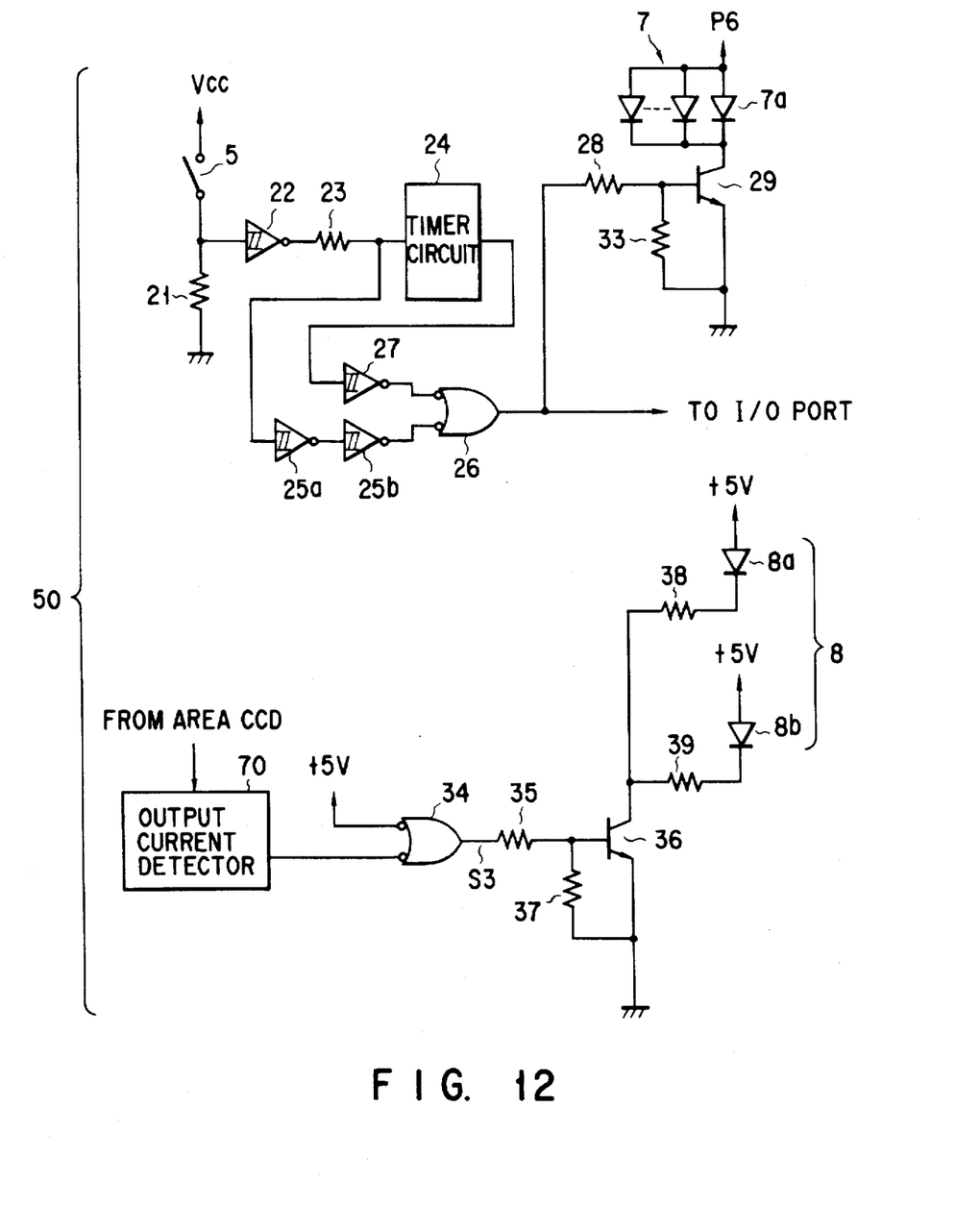
FIG. 12 is a diagram showing a third modification of the light source controller shown in FIG. 6.

FIG. 12 shows a third modification of the light source controller 50. The light source controller 50 is similar to the light source controller shown in FIG. 10, and therefore, common portions are denoted by the same reference numerals and the explanation therefor is omitted. The light source controller 50 of the third modification is not provided with the inverter circuit 31 and the monostable multivibrators 30 and 32 shown in FIG. 8, but instead of this, it has an output current detector 70. The 2-dimensional CCD 13 periodically effects the operation of performing photoelectric conversion on the reflected light from the 2-dimensional code illuminated by the illumination light source 7 and then generating an output voltage which varies with charge accumulatively stored in each of the photo-elements by the photoelectric conversion. The photoelectric conversion is effected for every 1/50 sec., for example, and the period of the photoelectric conversion is equal to a period of time required for attaining the maximum charge amount MAX (FIG. 13) from the light reflected on a white part of the 2-dimensional code. An output voltage of the 2-dimensional CCD 13 is not generated in the image sensing operation in which the above photoelectric conversion is effected so that an output current will not flow from the 2-dimensional CCD 13. Therefore, the output current detector 70 generates an output signal of low level from the output terminal thereof when an output current of the area CCD 13 is detected and generates an output signal of high level from the output terminal thereof when an output current of the area CCD 13 is not detected. The first inverting input terminal of the OR circuit 34 is connected to the power supply of 5 V and the second inverting input terminal of the OR circuit 34 is connected to the output terminal of the output current detector 70.

In the light source controller 50 shown in FIG. 12, when the trigger switch 5 is turned on at time T0, a switch signal S1 is raised to the high level. The timer circuit 24 generates an output signal of high level after the rise of the switch signal. The output signal is kept at the high level for a preset period of time which is required for the area CCD 13 to repeat the image sensing operation even if the trigger switch 5 is immediately turned off. An output signal S2 of the OR circuit 26 is set at the high level for a period from the time when one of the switch signal S1 and an output signal of the timer circuit 24 rises until both of the signals fall. The output signal S2 is used as a drive control signal for the illumination light source 7. The transistor 29 supplies a drive current to the illumination LEDs 7a to turn on the LEDs when the output signal S2 is set at the high level and interrupts the supply of the drive current to turn out the illumination LEDs 7a when the output signal S2 is set at the low level. Further, an output signal S3 of the OR circuit 34 is used as a drive control signal for the guide light source 8 which does not depend on the drive control signal for the illumination light source 7. The transistor 36 supplies a drive current to the spot beam LEDs 8a and 8b to turn on the LEDs when the output signal S3 is set at the high level and interrupts the supply of the drive current to turn out the spot beam LEDs 8a and 8b when the output signal S3 is set at the low level.

Figure 13:
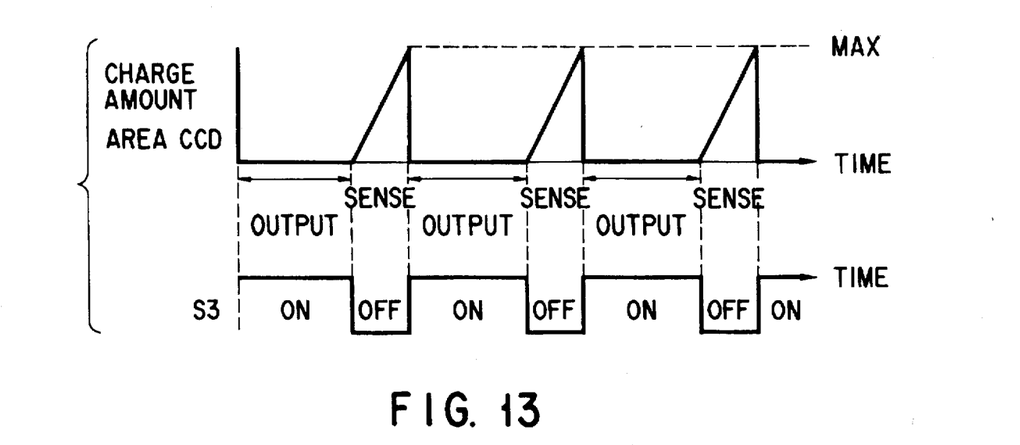
FIG. 13 is a timing chart for illustrating the operation of the third modification shown in FIG. 12.

That is, the illumination light source 7 is set in the de-activated state before the trigger switch 5 is turned on and is lit after the trigger switch 5 is turned on. The illumination light source 7 is kept lit for at least a period of image sensing time of the area CCD 13 and then turned out. The guide light source 8 is turned on when an output current from the area CCD 13 is detected by the output current detector 70 as shown in FIG. 13 and is turned out when the output current is not detected.

In the third modification, the guide light source 8 flashes on and off at a frequency equal to the frequency of the image sensing operation of the area CCD 13 and looks as if it is always lit. However, since the guide light source 8 is kept unlit in the operation period in which the image is actually sensed by photoelectric conversion, the 2-dimensional code can be prevented from being illuminated with non-uniform light intensity distribution. That is, an image of desired contrast ratio can be formed on the light receiving surface of the area CCD 13, and therefore, the image can be correctly converted into image data.

Further, if the light source controller 50 shown in FIG. 12 is modified such that the illumination light source 7 can be continuously lit and the image sensing operation of the 2-dimensional CCD 13 can be repeated in the illumination light from the illumination light source 7, image data of the 2-dimensional code can be automatically derived without operating the trigger switch 5 after the reading window 4a is disposed on the 2-dimensional code. With the above construction, when the 2-dimensional code is set within a close distance of 10 mm or less from the reading window 4a and set within the reading range, correct black/white data can be derived from the image data so that the decoding process can be completed without causing error.

Further, in the above embodiment, the guide light source 8 is constructed by the two spot beam LEDs 8a and 8b, but it may be constructed by three or more light emitting elements which can emit spot beam lights, for example. The intersecting position of the spot beam lights from the guide light source is not necessarily set at a distance of 20 mm from the reading window 4a.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical code reader comprising:

a reading window;

a reading device which reads an image of a 2-dimensional code via said reading window in a state where said reading window is set within a preset distance from the 2-dimensional code, and said reading device converting the sensed image into image data;

said reading device including:

an illumination light source for applying an illumination light to said 2-dimensional code via said reading window;

a trigger switch operated in a state where said reading window is set within said preset distance from the 2-dimensional code; and an illumination light source controller which turns on said illumination light source upon operation of said trigger switch;

a guide light source for applying guide light beams which indicate a center of a reading range of said reading device to guide the 2-dimensional code within the reading range of said reading device; and a guide light source controller which (i) turns on said guide light source before turn-on of said illumination light source and which (ii) turns off said guide light source only after turn-on of said illumination light source so as to extinguish the guide light beams while the illumination light source remains on, such that both said guide light source and said illumination light source are simultaneously on for a period of time;

a portable frame having an opening used as said reading window, for accommodating said reading device and said guide light source; and wherein said guide light source includes a plurality of light emitting elements for emitting respective spot beams which serve as said guide light beams, said spot beams intersecting one another at a position located the preset distance away from said reading window along a central axis of the reading range of said reading device.

2. An optical code reader according to claim 1, wherein said reading device includes an analyzing unit which analyzes the image data and decodes the 2-dimensional code based on the analyzed image data.

3. An optical code reader according to claim 1, wherein said central axis of the reading range passes the center of a plane of said reading window at right angles.

4. An optical code reading method for reading a 2-dimensional code using a reading device, the method comprising the steps of:

applying guide light beams which indicate a center of a reading range of the reading device to guide the 2-dimensional code within the reading range of the reading device;

setting a reading window of the reading device within a preset distance from the 2-dimensional code, using said guide light beams;

sensing an image of the 2-dimensional code via said reading window of the reading device in a state where said reading window is set within said preset distance from the 2-dimensional code;

said sensing step including:

turning on an illumination light upon operation of a trigger switch which is operated in a state where said reading window is set within said preset distance from the 2-dimensional code;

applying said illumination light to said 2-dimensional code via said reading window;

said applying step including applying said guide light beams to said 2-dimensional code before illuminating said 2-dimensional code with said illumination light, and stopping said applying of said guide light beams only after said illumination of said 2-dimensional code with said illumination light, such that said 2-dimensional code is simultaneously illuminated by both said guide light beams and said illumination light for a period of time; and sensing the image of the 2-dimensional code based on a reflected light obtained when the 2-dimensional code is illuminated by said illumination light;

converting the sensed image into image data; and turning off the guide light beams for a time period during which the image of the 2-dimensional code is sensed in said last-mentioned sensing step; and wherein said step of applying said guide light beams comprises applying at least two spot beams which intersect one another at a position located said preset distance away from said reading window along a central axis of the reading range of the reading device.

5. An optical code reading method according to claim 4, further comprising the step of analyzing the sensed image data and decoding the 2-dimensional code based on the analyzed sensed image data.

* * * * *

UNITED STATES PATENT AND TRADEMARK OFFICE
CERTIFICATE OF CORRECTION

PATENT NO. : 5,750,977
DATED : May 12, 1998
INVENTOR(S) : SUZUKI, Masashi

It is certified that error appears in the above-identified patent and that said Letters Patent is hereby corrected as shown below:

On the Title page, Item [73] Assignee, "Tec" should be --TEC--.

Signed and Sealed this

Ninth Day of March, 1999

Attest:

Q. TODD DICKINSON

*Attesting Officer*     *Acting Commissioner of Patents and Trademarks*